United States Patent
Choi et al.

(10) Patent No.: US 9,036,111 B2
(45) Date of Patent: May 19, 2015

(54) LIQUID CRYSTAL DISPLAY MODULE

(75) Inventors: Hee Ryoul Choi, Seoul (KR); Jeong Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 13/542,215

(22) Filed: Jul. 5, 2012

(65) Prior Publication Data

US 2013/0033660 A1 Feb. 7, 2013

(30) Foreign Application Priority Data

Aug. 5, 2011 (KR) .................. 10-2011-0078013

(51) Int. Cl.
*G02F 1/1333* (2006.01)
*G02F 1/1335* (2006.01)
*F21V 8/00* (2006.01)

(52) U.S. Cl.
CPC ........ *G02B 6/0091* (2013.01); *G02F 1/133603* (2013.01); *G02F 1/133615* (2013.01); *G02F 1/133504* (2013.01); *G02B 6/0073* (2013.01); *G02F 2001/133314* (2013.01); *G02F 2001/133317* (2013.01); *G02F 2202/28* (2013.01)

(58) Field of Classification Search
USPC .......................................................... 349/60
See application file for complete search history.

(56) References Cited

U.S. PATENT DOCUMENTS

| | | |
|---|---|---|
| 2009/0103282 A1 | 4/2009 | Itaya |
| 2010/0141865 A1 | 6/2010 | Jung |
| 2010/0182529 A1* | 7/2010 | Nakanishi .................. 349/58 |
| 2010/0253872 A1 | 10/2010 | Park et al. |
| 2010/0328580 A1 | 12/2010 | Kim |

FOREIGN PATENT DOCUMENTS

KR 10-2007-0108991 A 11/2007

* cited by examiner

*Primary Examiner* — Wen-Ying P Chen
(74) *Attorney, Agent, or Firm* — Jefferson IP Law, LLP

(57) ABSTRACT

A Liquid Crystal Display (LCD) module for preventing a hot spot that deteriorates an external appearance quality using existing components is provided. The LCD module includes an optical sheet disposed at an upper surface of a light guide plate, a Light Emitting Diode Flexible Printed Circuit Board (LED FPCB) on which an LED for emitting light to the light guide plate is mounted, and a double-sided tape having a portion protruding toward the optical sheet further than the LED FPCB and adhered to a mounting surface of the LED FPCB. Therefore, occurrence of a hot spot can be reduced without increasing components. Further, because a thickness increase of a local portion is unnecessary, a second failure such as panel lifting is not caused.

7 Claims, 5 Drawing Sheets

LIQUID CRYSTAL DISPLAY MODULE

PRIORITY

This application claims the benefit under 35 U.S.C. §119 (a) of a Korean patent application filed on Aug. 5, 2011 in the Korean Intellectual Property Office and assigned Serial No. 10-2011-0078013, the entire disclosure of which is hereby incorporated by reference.

BACKGROUND OF THE INVENTION

1. Field of the Invention

The present invention relates to a Liquid Crystal Display (LCD) module. More particularly, the present invention relates to an LCD module for preventing a hot spot that deteriorates an external appearance quality using existing components.

2. Description of the Related Art

In general, an LCD module is widely used as a display module for a portable electronic device having a multimedia function, such as a mobile phone, an MPEG Audio Layer-3 (MP3) player, a Personal Digital Assistant (PDA), a Digital Multimedia Broadcasting (DMB) terminal, an electronic dictionary, and the like.

FIG. 1 is a partial perspective view illustrating an LCD module of the related art.

Referring to FIG. 1, an LCD module 100 includes a backlight unit 110 and an LCD panel 130.

The backlight unit 110 includes a reflection sheet 111, light guide plate 112, and optical sheet 116. A Light Emitting Diode (LED) 140, which is a light source of the backlight unit 110, is disposed at a side portion of the light guide plate 112. The LED 140 is mounted on an LED Flexible Printed Circuit Board (FPCB) 141 disposed at a predetermined gap G from the optical sheet 116. The LED FPCB 141 is attached to the light guide plate 112 by a double-sided tape 142. The optical sheet 116 includes a diffusion sheet 113, a first prism sheet 114, and a second prism sheet 115. The LCD panel 130 includes a lower polarizing plate 131, a Thin Film Transistor (TFT) glass 132, a color filter glass 133, and an upper polarizing plate 134.

Light emitted from the LED 140 of the LCD module 100 displays a normal screen to a user by sequentially passing through the light guide plate 112, the diffusion sheet 113, the first prism sheet 114, the second prism sheet 115, and the LCD panel 130. However, light A that passes through a gap formed between the optical sheet 116 and the LED FPCB 141 passes through only the first and second prism sheets 114 and 115 without passing through the diffusion sheet 113, thereby being viewed by a user at a high viewing angle. Therefore, the light A is not diffused by the diffusion sheet 113 and is focused by the first and second prism sheets 114 and 115, and thus a problem that a hot spot is viewed in a viewing angle exists.

SUMMARY OF THE INVENTION

Aspects of the present invention are to address at least the above-mentioned problems and/or disadvantages and to provide at least the advantages described below. Accordingly, an aspect of the present invention is to provide a Liquid Crystal Display (LCD) module that can prevent a hot spot through a shape change of existing components.

In accordance with an aspect of the present invention, an LCD module is provided. The LCD module includes an optical sheet disposed at an upper surface of a light guide plate, a Light Emitting Diode Flexible Printed Circuit Board (LED FPCB) on which an LED for emitting light to the light guide plate is mounted, and a double-sided tape having a portion protruding toward the optical sheet further than the LED FPCB and adhered to a mounting surface of the LED FPCB.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
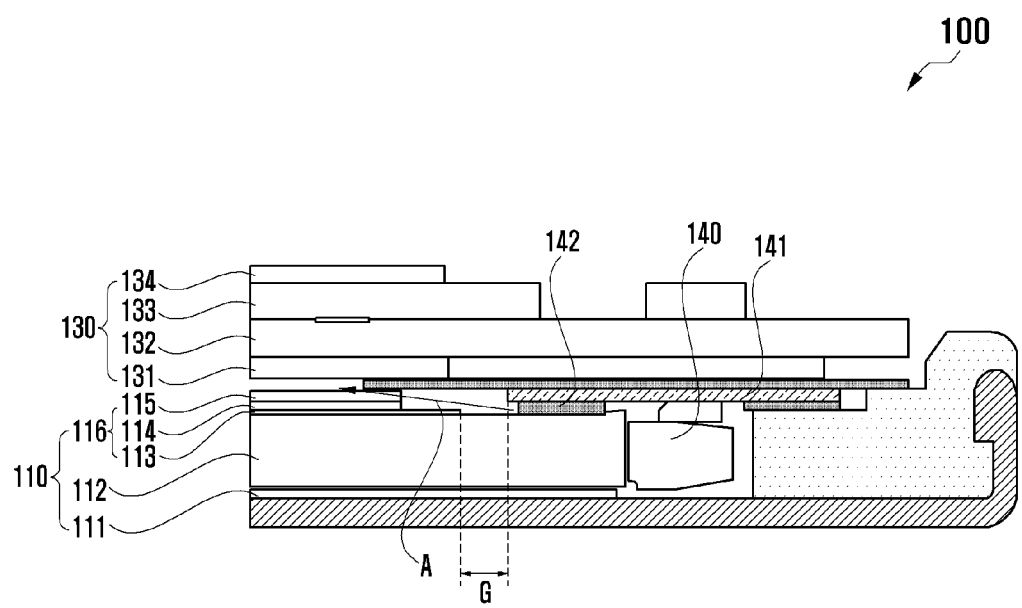
FIG. 1 is a partial perspective view illustrating a Liquid Crystal Display (LCD) module of the related art.
Figure 2:
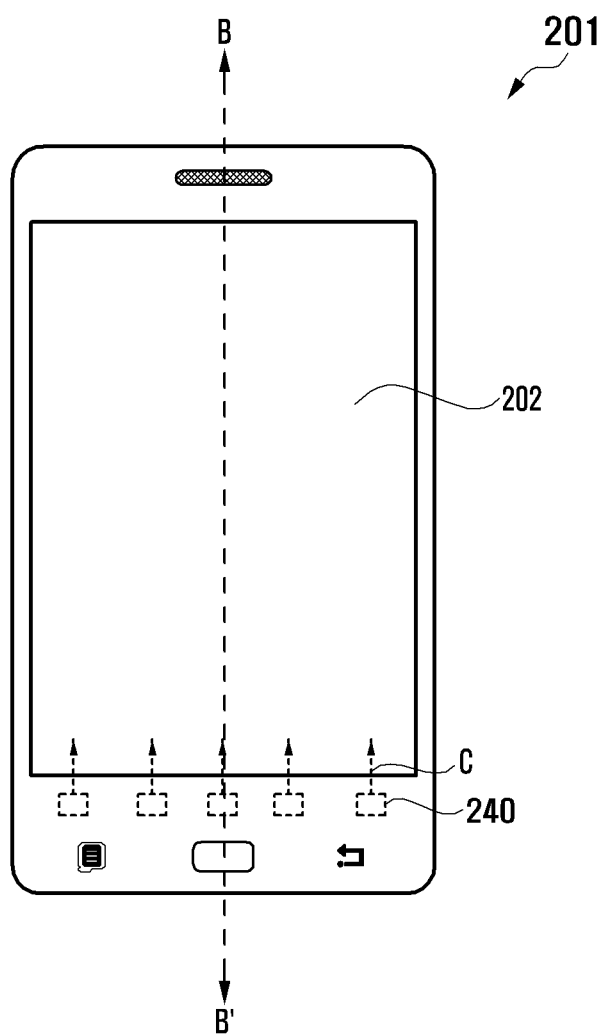
FIG. 2 is a plan view illustrating a mobile terminal having an LCD module according to an exemplary embodiment of the present invention.
Figure 3:
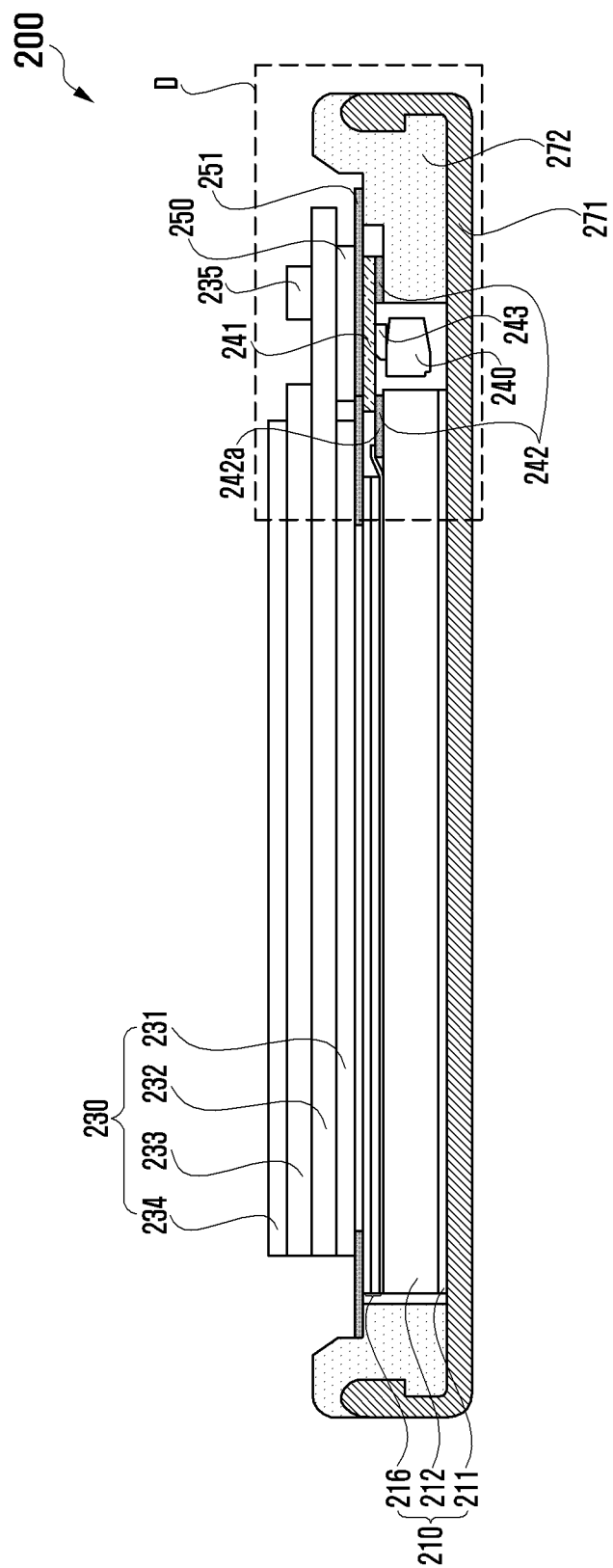
FIG. 3 is a cross-sectional view illustrating an LCD module taken along line B-B' of FIG. 2 according to an exemplary embodiment of the present invention.
Figure 4:
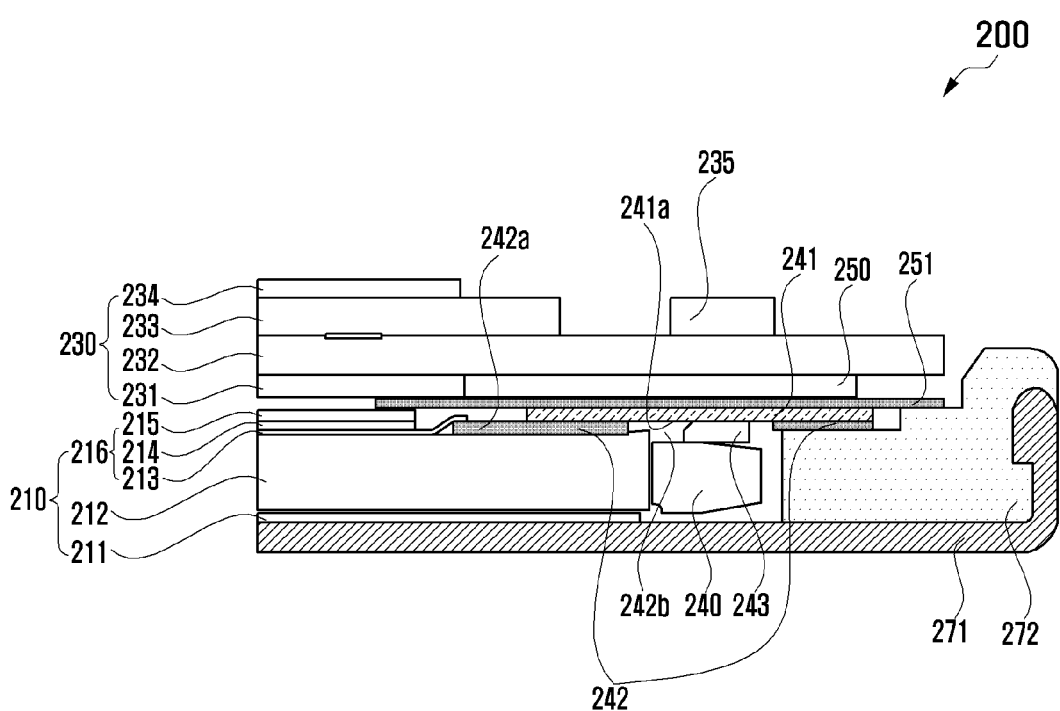
FIG. 4 is an enlarged cross-sectional view illustrating a portion indicated by dotted line D of FIG. 3 according to an exemplary embodiment of the present invention.
Figure 5:
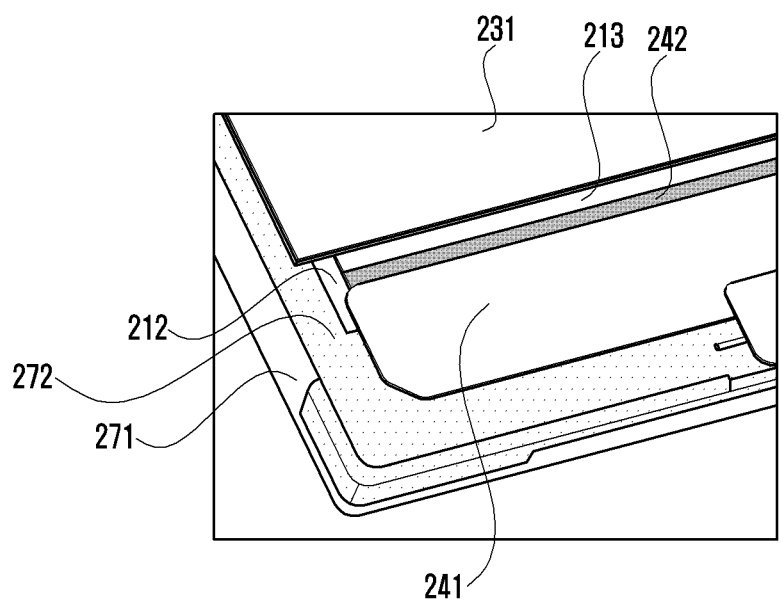
FIG. 5 is a partial perspective view illustrating an LCD module of FIG. 3 according to an exemplary embodiment of the present invention.

FIG. 2 is a plan view illustrating a mobile terminal having a Liquid Crystal Display (LCD) module according to an exemplary embodiment of the present invention, FIG. 3 is a cross-sectional view illustrating an LCD module taken along line B-B' of FIG. 2 according to an exemplary embodiment of the present invention, FIG. 4 is an enlarged cross-sectional view illustrating a portion indicated by dotted line D of FIG. 3 according to an exemplary embodiment of the present invention, and FIG. 5 is a partial perspective view illustrating an LCD module of FIG. 3 according to an exemplary embodiment of the present invention. For reference, in FIG. 2, line B-B' passes through a window 202 in a length direction of a mobile terminal 201, and light C emitted from an LED 240 advances toward a light guide plate (not shown).

Referring to FIGS. 2 to 5, an LCD module 200 includes a backlight unit 210 and an LCD panel 230.

The backlight unit 210 is disposed at a lower part of the LCD panel 230, which is not a self luminescent display, and performs a function of evenly radiating light so that a display image may be viewed by a user. The backlight unit 210 includes a reflection sheet 211, a light guide plate 212, an optical sheet 216, a Light Emitting Diode (LED) 240, an LED Flexible Printed Circuit Board (FPCB) 241, a metal chassis 271, and a mold frame 272. The light guide plate 212 guides light generated in the LED 240. The LED 240, which is a light source of the backlight unit 210, is disposed at a side portion of the light guide plate 212. The LED 240 is mounted on the LED FPCB 241 by an LED terminal 243. In a lower part of the light guide plate 212, the reflection sheet 211, for reflecting light transmitted downward through a lower surface of the light guide plate 212 toward an upper surface of the light guide plate 212, is disposed. The optical sheet 216 is disposed at an upper surface of the light guide plate 212. The optical sheet 216 includes a diffusion sheet 213 disposed at an upper surface of the light guide plate 212, a first prism sheet 214 disposed at an upper surface of the diffusion sheet 213, and a second prism sheet 215 disposed at an upper surface of the first prism sheet 214. The diffusion sheet 213 diffuses light applied from the light guide plate 212, and the first prism sheet 214 and the second prism sheet 215 focus light applied from the diffusion sheet 213 in a first direction and a second direction orthogonal to the first direction, respectively.

A double-sided tape 242 is adhered to a mounting surface 241a of the LED FPCB 241. In the double-sided tape 242, a portion formed between the LED FPCB 241 and the light guide plate 212 attaches the LED FPCB 241 and the light guide plate 212, and a portion formed between the LED FPCB 241 and the mold frame 272 adheres the LED FPCB 241 and the mold frame 272. The double-sided tape 242 includes a hole 242b for forming a space in which the LED 240 is mounted on the LED FPCB 241. Further, the double-sided tape 242 has a portion 242a protruding toward the optical sheet 216 further than the LED FPCB 241. The portion 242a protruding toward the optical sheet 216 is adhered to the light guide plate 212. Further, as shown in FIG. 4, it is preferable that at least one layer of the optical sheet 216 is overlapped with the portion 242a protruding toward the optical sheet 216. However, the optical sheet 216 may closely contact without being overlapped with the portion 242a protruding toward the optical sheet 216. Further, the diffusion sheet 213 of the optical sheet 216 may be adhered to the double-sided tape 242. It is preferable that the double-sided tape 242 is opaque.

The LCD panel 230 displays a desired image by changing a transmission form of light applied from the backlight unit 210 according to an electrical stimulus applied to a liquid crystal and includes a lower polarizing plate 231, a Thin Film Transistor (TFT) glass 232, a color filter glass 233, and an upper polarizing plate 234.

The lower polarizing plate 231 performs a function of polarizing light applied from the optical sheet 216 and is disposed at an upper part of the optical sheet 216. In an upper part of the lower polarizing plate 231, the TFT glass 232 that controls liquid crystal (not shown) formed in an upper surface in a pixel unit using a TFT is disposed. At the edge of an upper surface of the TFT glass 232, a liquid crystal display driver Integrated Circuit (IC) 235 for driving the liquid crystal display panel 230 is mounted. At the edge of a lower surface of the TFT glass 232, a spacer 250 is formed, and at a lower surface of the spacer 250, a double-sided tape 251 for adhering the LCD panel 230 and the backlight unit 210 is adhered. In an upper part of the TFT glass 232, the color filter glass 233 for determining a color of light that passes through the liquid crystal by coating a pixel having three primary colors consisting of red, blue, and green on glass is disposed. In an upper part of the color filter glass 233, the upper polarizing plate 234 for polarizing light transmitted from the color filter glass 233 is disposed.

According to an exemplary embodiment, the opaque double-sided tape 242 adhered to the mounting surface 241a of the LED FPCB 241 is protruding toward the optical sheet 216 further than the LED FPCB 241. Accordingly, in light emitted from the LED 240, light advancing toward a gap between the LED FPCB 241 and the optical sheet 216 can be intercepted. Further, because the optical sheet 216 may be overlapped with the portion 242a protruding toward the optical sheet 216, light that is not intercepted by the double-sided tape 242 in light emitted from the LED 240 can be diffused by the diffusion sheet 213. Accordingly, light emitted from the LED 240 can be prevented from being viewed as a hot spot at a high viewing angle.

According to exemplary embodiments of the present invention, because a double-sided tape adhered to a mounting surface of an LED FPCB is protruding toward an optical sheet further than the LED FPCB, a hot spot can be improved without increasing components. Further, because a thickness increase of a local portion is unnecessary, a second failure such as panel lifting is not caused.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Liquid Crystal Display (LCD) module, the module comprising:
   an optical sheet disposed at an upper surface of a light guide plate;
   a Light Emitting Diode Flexible Printed Circuit Board (LED FPCB) on which an LED for emitting light to the light guide plate is mounted; and
   a double-sided tape having a portion protruding toward the optical sheet further than the LED FPCB and adhered to a mounting surface of the LED FPCB,
   wherein the protruding portion of the double-sided tape is adhered to the light guide plate and only a diffuser of the optical sheet is in direct contact with and overlapped with the protruding portion of the double-sided tape.

2. The LCD module of claim 1, wherein a portion of the double sided tape protruding toward the optical sheet contacts the optical sheet without overlapping the optical sheet.

3. The LCD module of claim 1, wherein the optical sheet comprises:
   a first prism sheet disposed at an upper surface of the diffuser; and
   a second prism sheet disposed at an upper surface of the first prism sheet, wherein the diffuser is disposed at an upper surface of the light guide plate.

4. The LCD module of claim 3, wherein the diffuser is attached to the double-sided tape.

5. The LCD module of claim 1, wherein the portion protruding toward the optical sheet is adhered to the light guide plate.

6. The LCD module of claim 1, wherein the double-sided tape comprises a portion for attaching the LED FPCB and a portion for attaching a mold frame.

7. The LCD module of claim 1, wherein the double-sided tape comprises an opaque material.

* * * * *